United States Patent [19]
Guilford

[11] Patent Number: 5,836,198
[45] Date of Patent: Nov. 17, 1998

[54] COMBINATION SQUARE AND BENDING TOOL

[76] Inventor: Brian L. Guilford, 13045 Dow Rd., Sunfield, Mich. 48890

[21] Appl. No.: 2,508

[22] Filed: Jan. 2, 1998

[51] Int. Cl.[6] ...................................................... B21D 5/16
[52] U.S. Cl. .................................. 72/458; 33/429; 33/474
[58] Field of Search ............................ 72/457, 458, 479; 33/429, 474, 476

[56] References Cited

U.S. PATENT DOCUMENTS

| | | | |
|---|---|---|---|
| 338,444 | 3/1886 | Seargeant | 33/476 |
| 438,413 | 10/1890 | Groves . | |
| 697,594 | 4/1902 | Alteneder | 33/474 |
| 944,566 | 12/1909 | Mason | 72/548 |
| 2,166,347 | 7/1939 | Farney . | |
| 2,222,081 | 11/1940 | Leigh . | |
| 2,579,171 | 12/1951 | Bien . | |
| 2,800,818 | 7/1957 | Larson . | |
| 2,818,757 | 1/1958 | Pille . | |
| 3,248,921 | 5/1966 | Trout . | |
| 3,352,466 | 11/1967 | McAllister | 72/461 |
| 3,513,558 | 5/1970 | Kuchta | 33/474 |
| 3,848,454 | 11/1974 | Hall . | |
| 4,148,205 | 4/1979 | Boysen . | |
| 4,163,381 | 8/1979 | Hodshon . | |
| 4,191,043 | 3/1980 | Schaffer . | |
| 4,644,778 | 2/1987 | Newton, II . | |
| 4,934,175 | 6/1990 | Hensler et al. . | |
| 5,103,570 | 4/1992 | Nichols | 33/429 |
| 5,199,294 | 4/1993 | Murczek . | |
| 5,611,237 | 3/1997 | Harper | 72/458 |

*Primary Examiner*—David Jones
*Attorney, Agent, or Firm*—Mary M. Moyne; Ian C. McLeod

[57] ABSTRACT

A combination square and bending tool (10, 210 or 310) is described. The tool has a first leg (12, 212 or 312) and a second leg (14, 214 or 314) with the first leg having a bending portion. The bending portion includes a plate (16 and 18 and 316 and 318) mounted on the first leg and parallel and spaced apart from the first leg to create a slot (20, 220 and 320). To bend metal, the metal is inserted into the slot and the tool is rotated using the second leg to provide leverage.

12 Claims, 3 Drawing Sheets

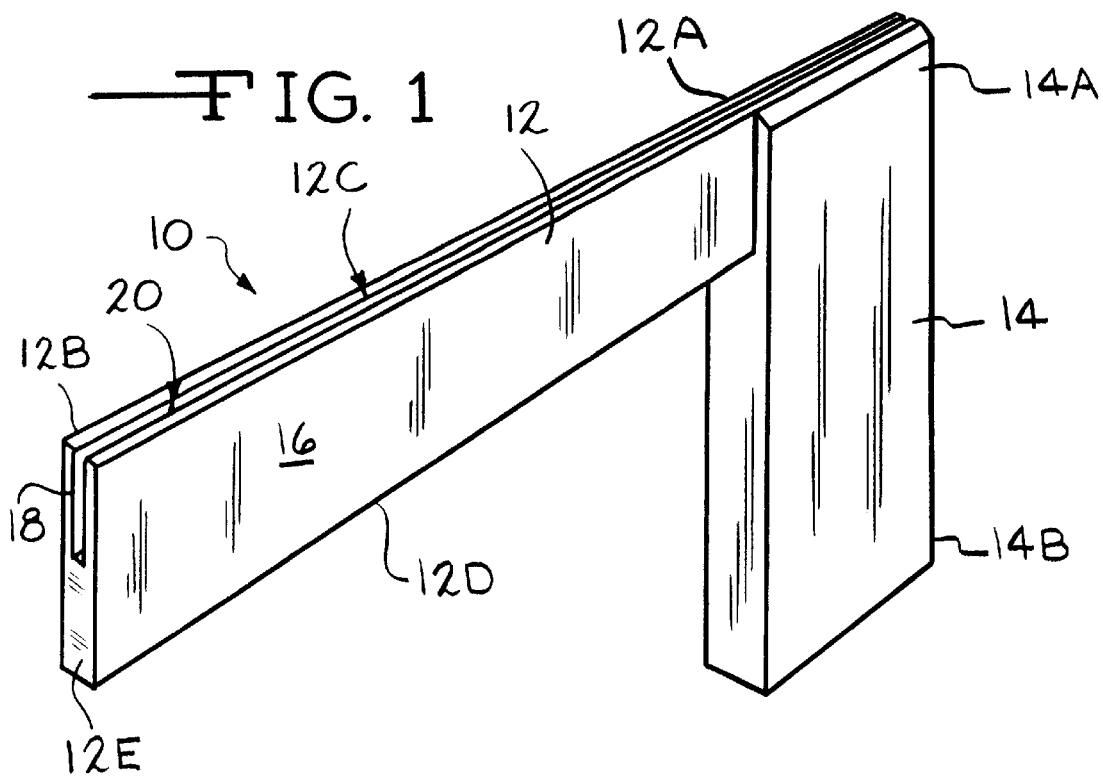
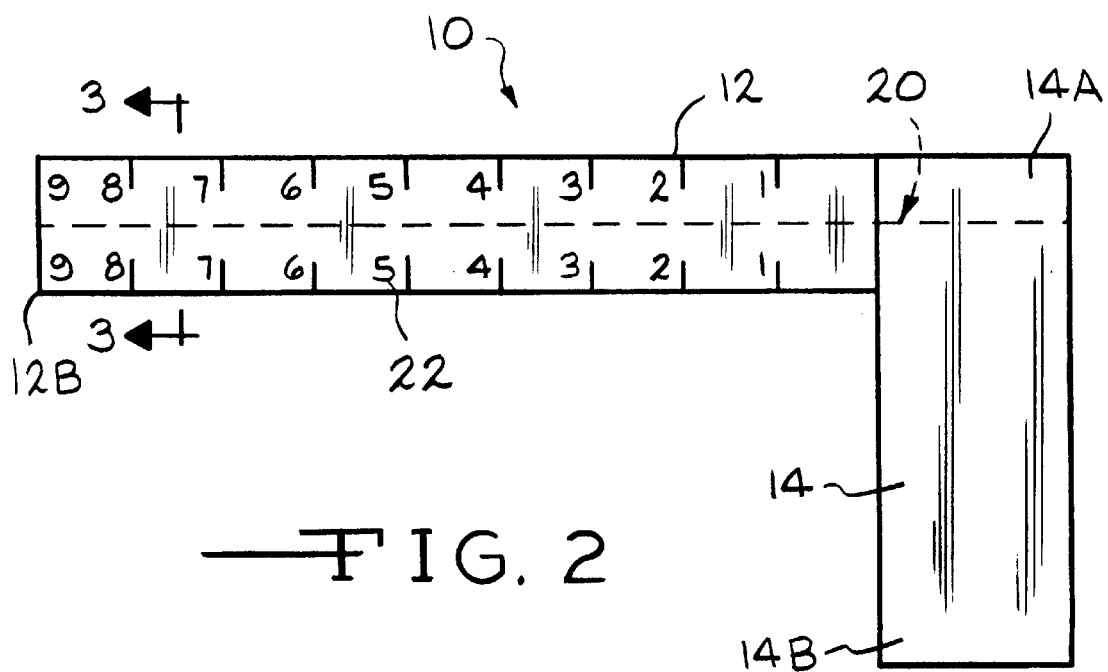

5,836,198

COMBINATION SQUARE AND BENDING TOOL

BACKGROUND OF THE INVENTION (1) Field of the Invention

The present invention relates to a combination square and metal bending tool. In particular, the present invention relates to a combination square and metal bending tool wherein the bending tool is formed in one of the legs of the square. The other leg of the square is used as a leverage handle to allow for easier bending of the metal.

(2) Description of the Related Art

The related art has shown various tools for bending metal. Illustrative are U.S. Pat. Nos. 4,934,175 to Hensler et al and 5,199,294 to Murczek. Hensler et al describes a tool for bending sheet metal which includes a pair of right angle members which are spaced apart and welded together to form a slot. A right angle rod is inserted through holes in the upwardly facing top surface and the downwardly facing bottom surface of the base wall of one of the members. The rod allows for leverage during bending. The upwardly facing surface of one wall can be provided with measurement indicia forming a ruler. Murczek shows a hand tool for bending metal sheets near an edge to form a flange. The tool has two flat plates which are parallel and spaced apart to form a sheet bending slot. A spacer is positioned between and secured to the forming plates.

Also, of interest are U.S. Pat. Nos. 438,413 to Groves; 2,222,081 to Leigh; 2,818,757 to Pille; 3,848,454 to Hall; 4,163,381 to Hodshon; 4,191,043 to Schaffer and 4,644,778 to Newton. II which show various types of tools which use spaced apart plates for bending metal.

Only of minimal interest are U.S. Pat. Nos. 2,166,347 to Farney; 2,579,171 to Bien; 2,800,818 to Larson; 3,248,921 to Trout and 4,148,205 to Boysen which show various types of tools and apparatuses for bending metal.

There remains the need for an apparatus which combines a square with a metal bending tool and which allows for use of one of the legs of the square as a bending tool while allowing the other leg of the square to be used as a handle.

OBJECTS

It is therefore an object of the present invention to provide a tool which can be used as a square and to bend sheet metal. Further, it is an object of the present invention to provide a tool which is easy to use to bend sheet metal. Still further, it is an object of the present invention to provide a tool which is inexpensive to manufacture. Further still, it is an object of the present invention to provide a tool which is lightweight and not bulky and which can be easily carried by the user when not in use.

These and other objects will become increasingly apparent by reference to the following drawings and the description.

BRIEF DESCRIPTION OF THE DRAWINGS

FIG. 1 is a perspective view of the first embodiment of the tool 10.

FIG. 2 is a front view of the first embodiment of the tool 10.

DETAILED DESCRIPTION OF THE PREFERRED EMBODIMENTS

The present invention relates to a tool for bending sheet metal, which comprises: a first leg having opposed ends; a second leg having opposed ends forming a longitudinal axis of the second leg and mounted at one end on one end of the first leg such that the first leg and second leg form a 90° angle such that both the first leg and second leg are in one plane and the second leg having a slot extending parallel to the longitudinal axis of the second leg to allow for insertion of the sheet metal for bending the sheet metal.

Further, the present invention relates to a combination square and sheet metal bending tool, which comprises: a square having two legs connected together such as to form a 90° angle; and a bending slot provided along at least one leg of the square to allow the leg of the square to be used to bend sheet metal.

Still further, the present invention relates to a method for bending sheet metal, which comprises: a first leg having opposed ends; a second leg having opposed ends forming a longitudinal axis of the second leg and mounted at one end on one end of the first leg such that the first leg and second leg form a 90° angle with both the first leg and second leg in one plane; the second leg having a slot extending parallel to the longitudinal axis of the second leg to allow for insertion of the sheet metal for bending the sheet metal; inserting an edge of the sheet metal to be bent into the slot; and grasping the tool by the first leg and rotating the first leg in a direction such as to bend the sheet metal in the direction.

Figure 3:
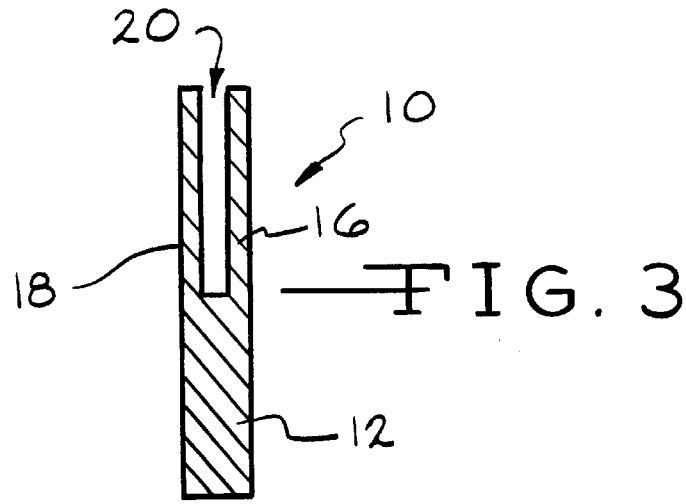
FIG. 3 is a cross-sectional end view along line 3—3 of FIG. 2 showing the slot 20.
Figure 4:
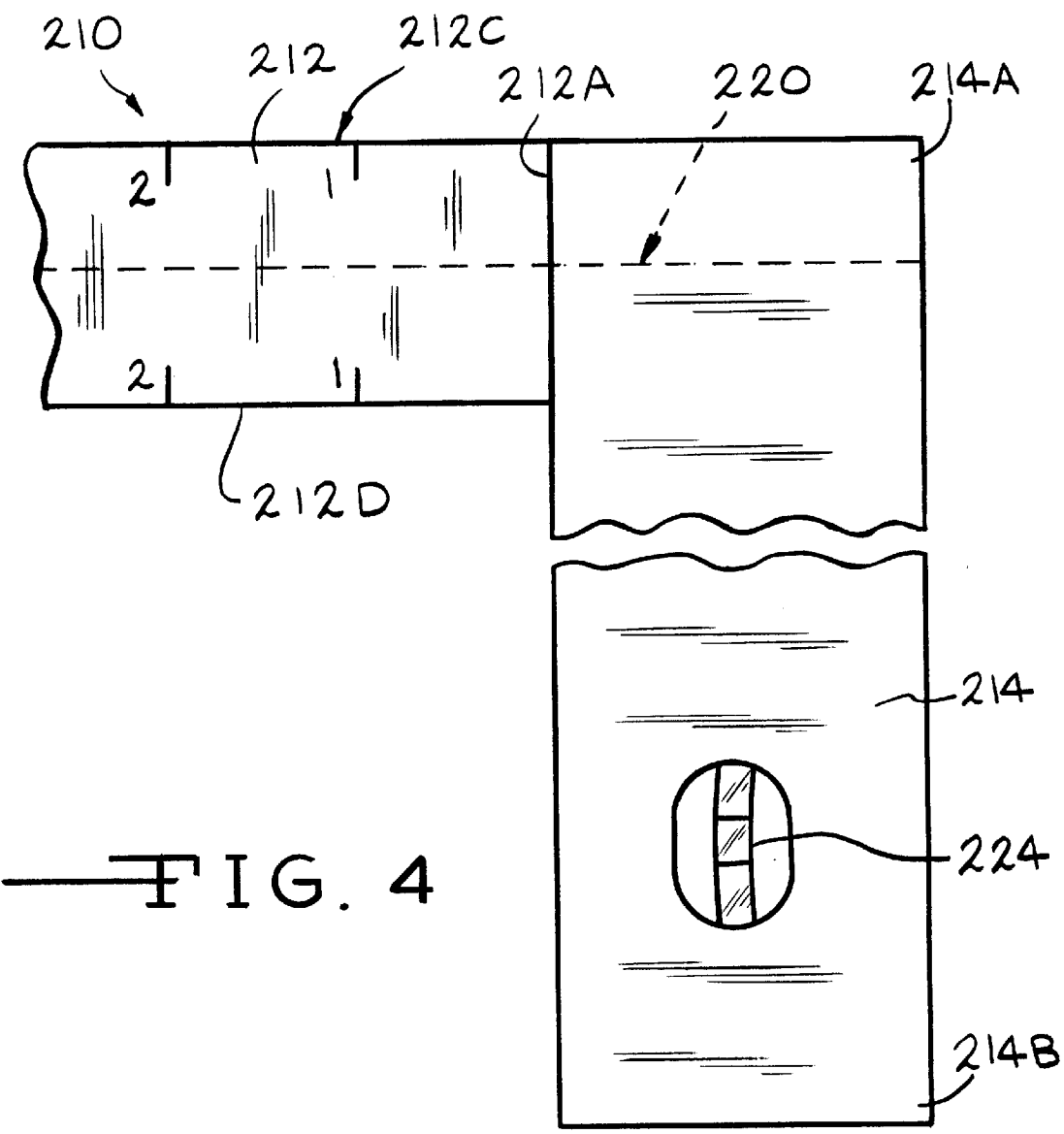
FIG. 4 is a front view of a second embodiment of the tool 210.
Figure 5:
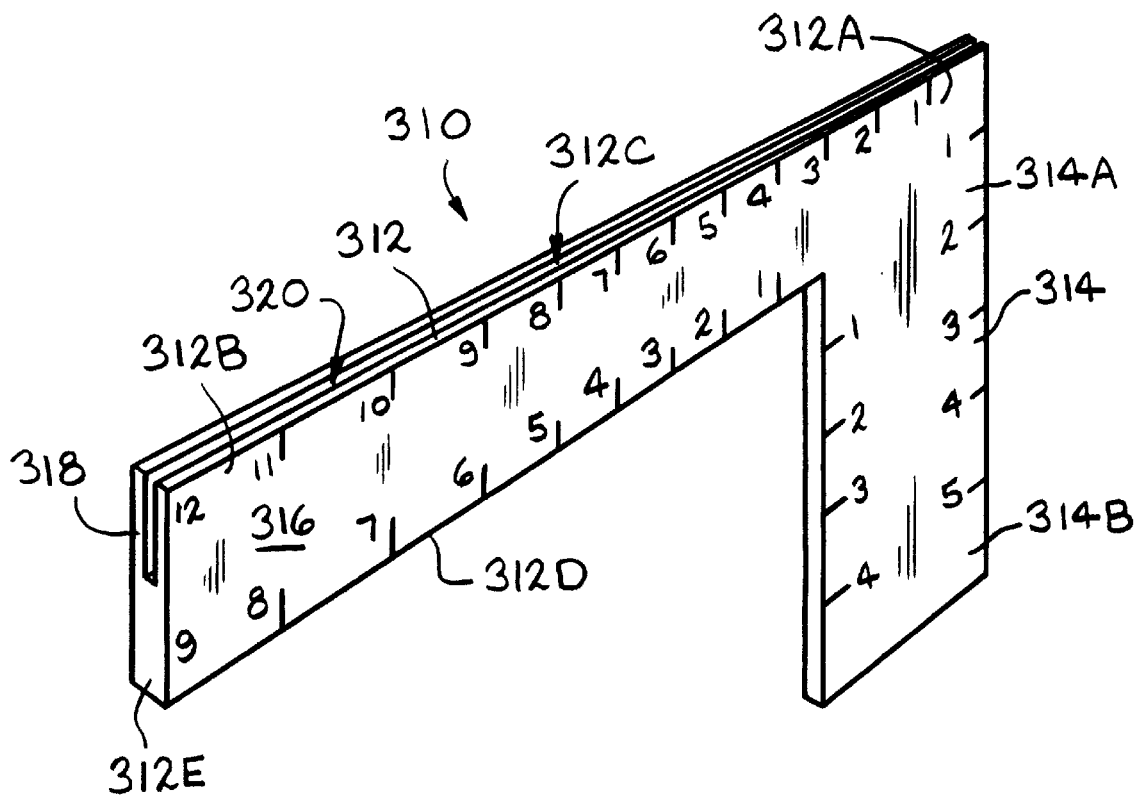
FIG. 5 is a front view of a third embodiment of the tool 310.

FIGS. 1 to 3 show the combination square and bending tool 10 of the first embodiment of the present invention. FIGS. 4 and 5 show the combination square and bending tool 210 and 310 of the second and third embodiments, respectively of the present invention. In all the embodiments, the tool 10, 210 or 310 is similar in shape to a standard, handheld square and includes a first leg 12, 212 or 312 and a second leg 14, 214 or 314. The first leg 12, 212 or 312 and second leg 14, 214 or 314 each have opposed ends 12A, 12B, 212A, 312A, 312B, 14A, 14B, 214A, 214B, 314A or 314B and are connected together at one of their ends 12A, 212A or 312A and 14A, 214A or 314A such as to form a 90° angle (FIGS. 1, 4 and 5).

The first leg 12, 212 or 312 of the tool 10, 210 or 310 preferably provides the first bending portion of the tool 10, 210 or 310. The first leg 12, 212 or 312 preferably includes two plates 16 or 316 and 18 or 318 extending along and between the ends 12A, 212A, 312A, 12B, or 312B of the first leg 12, 212 or 312. The plates 16 or 316 and 18 or 318 are preferably mounted in a parallel and spaced apart relationship such as to form a slot 20 or 320 extending along at least one edge of the second leg 14, 214 or 314. The plates 16 or 316 and 18 or 318 are preferably similar in size and shape to the first leg 12, 212 or 312 such that the slot 20 or 320 extends completely along one edge of the second leg 14, 214 or 314 (FIGS. 1 and 5). In the preferred embodiment, the slot 20 or 320 extends along the bottom edge 12C, 212C or 312C of the first leg 12, 212 or 312. However, the slot 20 or 320 could also extend along the top edge 12D, 212D or 312D of the side edge 12E, 212E or 312E of the second leg 14, 214 or 314 depending upon the use of the tool 10, 210 or 310. The second leg 14, 214 or 314 and plates 16 or 316 and 18 or 318 can be formed as a unitary piece with the slot 20 or 320 formed along one edge of the unitary piece. A spacer (not shown) can be provided between the plates 16 or 316 and 18 or 318 which allows the plates 16 or 316 and 18 or 318 to be mounted in a spaced apart relationship. The plates 16 or 316 and 18 or 318 can also be constructed as a unitary piece. The slot 20 or 320 preferably extends completely between the ends 14A, 214A or 314A and 14B, 214B or 314B of the second leg 14, 214 or 314 and is open on the ends 14A, 214A or 314A and 14B, 214B or 314B such that the tool 10, 210 or 310 is able to be used to bend sheet metal having a length greater than the length of the first leg 12, 212 or 312 (FIGS. 1 and 5). The slot 20 or 320 preferably has a depth of between 0.75 and 1.00 inches (1.91 and 2.54 cm) (FIGS. 1, 3 and 5). However, the depth of the slot 20 or 320 can be varied depending on the type or width of the bend to be made. The slot 20 or 320 can have a predetermined depth which allows the user to easily determine the depth of the bend. Alternatively, the plates 16 or 316 and 18 or 318 or legs 12, 212 or 312 and 14, 214 or 314 can be provided with openings (not shown) at different depths which will allow the user to see the depth of the metal in the slot 20 or 320 to determine the position of the bend. In the preferred embodiment, the width of the slot 20 or 320 is slightly greater than the thickness of the metal such that the metal is easily inserted into the slot 20 or 320. Alternatively, the slot 20 or 320 is of a larger width such that metals having various thicknesses can be bent by the same tool. In the preferred embodiment, the first leg 12, 212 or 312 is constructed of steel. The sheet metal (not shown) which is to be bent is preferably aluminum sheeting used as trim for aluminum siding.

In the preferred embodiment, as in a standard square, the second leg 14, 214 or 314 is preferably shorter in length than the first leg 12, 212 or 312. The second leg 14, 214 or 314 and first leg 12, 212 or 312 are preferably provided with measuring indicia 22 on both sides which allows the first and second legs 12, 212, 312 and 14, 214 or 314 to be used as a measuring stick or ruler.

In the first embodiment of the invention, the first leg 12 of the tool 10 has a thickness greater than the thickness of the second leg 14 (FIG. 1). The first and second legs 12 and 14 are connected together such that the second leg 14 extends into the first leg 12. Preferably, the second leg 14 extends the complete width of the first leg 12 and the first leg 12 extends the complete width of the second leg 14. The added thickness of the second leg 14 allows for easier grasping of the second leg 14 as a handle during bending.

In the second embodiment, the second leg 214 is provided with a level indicator 224 which allows the combination square and bending tool 210 to also be used as a level (FIG. 4). The level indicator 224 is similar to those well known in the art.

In the third embodiment as shown in FIG. 5, the first and second leg 312 and 314 of the tool 310 are constructed as a unitary piece (FIG. 5). The first and second legs 312 and 314 have the same thickness. Alternatively, the first leg 312 has a thickness equal to the thickness of the second leg 314 without the plate and slot (to be described in detail hereinafter). The first leg 312 of the tool 310 can be constructed of any material such as plastic or steel. The second leg 314 however preferably is constructed of steel or some hard material which allows for bending metal. However, it is understood that the size of the second leg 314 is dependent upon the particular use of the tool 310.

IN USE

The tool 10, 210 or 310 is preferably used similar to a standard square when it is to be used as a square. The added bending portion of the tool 10, 210 or 310 does not change the method of use of the tool 10, 210 or 310 as a square. The added bending portion of the tool 10, 210 or 310 also does not effect the use of the tool 10, 210 or 310 as a measuring device.

To use the tool 10, 210 or 310 to bend sheet metal, the user grasps the tool 10, 210 or 310 by the second leg 14, 214 or 314 using the second leg 14, 214 or 314 as a handle. The user then places the edge of the metal to be bent into the slot 20 or 320 in the bending portion of the tool 10, 210 or 310. The user inserts the metal into the slot 20 or 320 to the point where the metal is to be bent.

Once the metal is correctly inserted, the user grasps the second leg 14, 214 or 314 of the tool 10, 210 or 310 and rotates the second leg 14, 214 or 314 in the direction of the desired bend. The second leg 14, 214 or 314 provides extra leverage which allows for easier bending and enables a user to expend less force to bend the metal. The user rotates the second leg 14, 214 or 314 until the metal has been bent to the correct angle. For example, to put a 900 bend in the metal, the user rotates the second leg 14, 214 or 314 until the second leg 14, 214 or 314 is perpendicular to the sheet of metal. Once the metal is bent, the user removes the tool 10, 210 or 310 from the metal.

The combination of the square and bending tool 10, 210 or 310 in a single tool allows the user to carry a single tool where before it was necessary to carry two tools. Preferably, a square is a standard tool commonly carried by the user. Therefore, the user would not carry an extra tool. Further, the second leg 14, 214 or 314 of the tool 10, 210 or 310 allows for easier bending of the metal and allows the tool 10, 210 or 310 to be easily carried on a tool belt.

It is intended that the foregoing description be only illustrative of the present invention and that the present invention be limited only by the hereinafter appended claims.

I claim:

1. A tool for bending sheet metal, which comprises:
   (a) a first leg having opposed ends;
   (b) a second leg having opposed ends forming a longitudinal axis of the second leg and mounted at one end on one end of the first leg such that the first leg and second leg form a 90° angle such that both the first leg and second leg are in one plane and the second leg having a slot extending parallel to the longitudinal axis of the second leg to allow for insertion of the sheet metal for bending the sheet metal.

2. The tool of claim 1 wherein a plate is mounted on, parallel to and spaced apart from the second leg and wherein the slot is formed between the second leg and the plate.

3. The tool of claim 1 wherein the first leg is thicker than the second leg and wherein when bending the sheet metal, the first leg is grasped and rotated to provide a handle for leverage during bending.

4. The tool of claim 1 wherein the first and second legs are provided with measuring indicia.

5. The tool of claim 2 wherein the second leg and the plate are a unitary piece.

6. A combination square and sheet metal bending tool, which comprises:
   (a) a square having two legs connected together such as to form a 90° angle; and
   (b) a bending slot provided along at least one leg of the square to allow the leg of the square to be used to bend sheet metal.

7. The tool of claim 6 wherein the legs of the square are provided with measuring indicia.

8. The tool of claim 6 wherein the legs of the square have a different length and wherein the bending slot is provided on a longer leg of the square.

9. The tool of claim 6 wherein the bending slot is provided by a plate mounted along and parallel to one of the legs of the square and spaced apart from the leg such as to provide the slot between the leg and the plate to allow for insertion of the sheet metal to be bent.

10. The tool of claim 6 wherein one of the legs is provided with a level indicator.

11. The tool of claim 6 wherein the tool is constructed of steel in order to bend the sheet metal which is aluminum.

12. A method for bending sheet metal, which comprises:

(a) a first leg having opposed ends; a second leg having opposed ends forming a longitudinal axis of the second leg and mounted at one end on one end of the first leg such that the first leg and second leg form a 90° angle with both the first leg and second leg in one plane; the second leg having a slot extending parallel to the longitudinal axis of the second leg to allow for insertion of the sheet metal for bending the sheet metal;

(b) inserting an edge of the sheet metal to be bent into the slot; and (c) grasping the tool by the first leg and rotating the first leg in a direction such as to bend the sheet metal in the direction.

\* \* \* \* \*